United States Patent [19]

Treffert

[11] Patent Number: 5,913,822
[45] Date of Patent: Jun. 22, 1999

[54] OPTIMIZATION OF PARAMETERS IN NUCLEAR MEDICINE STUDIES BEFORE THE STUDIES ARE CONCLUDED

[75] Inventor: Jon D. Treffert, Schaumburg, Ill.

[73] Assignee: Siemens Medical Systems, Inc., Iselin, N.J.

[21] Appl. No.: 07/765,654

[22] Filed: Sep. 25, 1991

[51] Int. Cl.⁶ ...................................................... A61B 6/00
[52] U.S. Cl. .......................... 600/436; 128/920; 128/922; 250/370.08; 250/370.11
[58] Field of Search ............................... 128/653.1, 653.2, 128/654, 659, 920, 922, 923; 364/413.13, 413.14, 413.15, 413.16, 413.24; 378/20, 62; 250/370.08, 370.09, 370.11, 363.02, 363.01; 600/436, 431, 405, 407, 425

[56] References Cited

U.S. PATENT DOCUMENTS

| | | | |
|---|---|---|---|
| 4,755,680 | 7/1988 | Logan | 250/363.01 |
| 4,780,823 | 10/1988 | Stoub et al. | 364/413.13 |
| 4,839,807 | 6/1989 | Doi et al. | 382/6 |
| 4,839,808 | 6/1989 | Koral et al. | 364/413.24 |
| 4,907,252 | 3/1990 | Aichinger et al. | 128/653.1 |
| 4,922,915 | 5/1990 | Arnold et al. | 128/653.1 |
| 4,943,726 | 7/1990 | Plummer | 250/363.04 |
| 4,992,666 | 2/1991 | Takeo | 364/413.13 |
| 5,027,817 | 7/1991 | John | 128/653.1 |
| 5,080,100 | 1/1992 | Trotel | 128/653.1 |
| 5,165,410 | 11/1992 | Warne et al. | 128/653.1 |

FOREIGN PATENT DOCUMENTS

| | | |
|---|---|---|
| 0093422 | 11/1983 | European Pat. Off. . |
| 0154404 | 9/1985 | European Pat. Off. . |
| 2325055 | 9/1976 | France . |

OTHER PUBLICATIONS

IEEE Transactions on Nuclear Science, vol. NS–29 (Aug. 1982).
Phys. Med. Biol., vol. 25 (1980).
Phys. Med. Biol., vol. 30 (1985).
Phys. Med. Biol., vol. 31 (1986).
A.S. Houston, The Use of Cluster Analysis and Constrained Optimization Techniques in Factor Analysis of Dynamic Structures (1988).
Phys. Med. Biol., vol. 32 (1987).
Martin Samal The Reality and Meaning of Physiological Factors.
Eur. J. Nucl. Med., No. 13 (1987).
J. Nucl. Med., vol. 29,(Feb., 1988).
J. Nucl. Med. vol. 25, (1988).
Eur. J. Nucl. Med., No. 14 (1988).

*Primary Examiner*—Brian L. Casler
*Attorney, Agent, or Firm*—Mark H. Jay

[57] ABSTRACT

Data from a nuclear medicine study is classified in real time into categories which include image data relating to image pixels which are essential covarient. The results of the classification process permit a determination of, e.g., whether the camera is properly positioned at an early stage of the study and long before the study is completed. It is then possible to reposition the camera so as to obtain data which will be useful. As a result, it is unnecessary to wait until the end of a prolonged study in order to determine whether the study was taken under appropriate conditions.

6 Claims, 14 Drawing Sheets

FIG. 1

Anatomic Image 1

Anatomic Image 2

Time Factor 1

Time Factor 2

FIG. 2

COMPOSITE IMAGE SEQUENCE

FIG. 3

COMPOSITE IMAGE SEQUENCE WITH NOISE

FIG. 5

PC Image 1

PC Image 2

FIG. 6

BACKGROUND

VF Image 1

VF Image 2

Time Factor 1

Time Factor 2

FIG. 12C
50° LAO

FIG. 13A

30° LAO

FIG. 13B

40° LAO

FIG. 13C

50° LAO

OPTIMIZATION OF PARAMETERS IN NUCLEAR MEDICINE STUDIES BEFORE THE STUDIES ARE CONCLUDED

BACKGROUND OF THE INVENTION

The invention relates to image processing, and more particularly relates to processing of images produced by scintillation cameras. In its most immediate sense, the invention relates to real-time image processing of nuclear medicine data in such a manner as to make it possible to correct for mispositioning of the patient or for collection of insufficient data before a patient study is concluded.

In a nuclear medicine study, a radioisotope is administered to the patient and the gamma radiation which exits the patient's body is collimated and converted to scintillation flashes in a scintillation crystal. These flashes (or events) are detected by photomultipliers which are placed in operative relation with the crystal and images of the patient's body may be formed using signal processing circuitry that processes electrical signals produced by the photomultipliers.

To produce a two-dimensional (planar) or three-dimensional (tomographic) image of e.g. the patient's heart, it is necessary to collect large quantities of data. This requires time; a typical study may last for 30 minutes or more. At present, the data thus collected is not utilized "on the fly"; only after the study has been completed by acquiring a predetermined number of events is it possible to determine whether the study has in fact elicited the information of interest.

For example, let it be assumed that an equilibrium gated blood pool study is to be conducted in order to determine the ejection fraction of the patient's left ventricle. To do this, the camera must be so positioned with respect to the patient that the blood pool in the left ventricle does not overlap the blood pools in the other three chambers of the patient's heart.

It is difficult if not impossible to know on an a priori basis whether the positioning between camera and patient is exactly correct, given that the orientation of the heart within the patient's body can vary over a comparatively wide range. Thus, it often happens that at the end of a study, the radiologist discovers that such positioning is slightly off. This means that the radiologist must choose between conducting another study (and thereby exposing the patient to more radiation and tying up the camera for an additional period of time) or using a suboptimal study.

Furthermore, in such a study, the proper measure to use in determining when the study should end is the number of events originating at the patient's left ventricle and not the total number of events which are detected by the camera. This is because the distribution of the radioisotope within the patent's body may be otherwise than anticipated and also because events from the heart region of interest may be attenuated differently than expected. In conventional scintillation cameras, the software does not permit incoming events to be examined "on the fly", so that it is impossible to distinguish between events which originate in the left ventricular blood pool and those which originate elsewhere. This makes it necessary to use total events to determine study duration, even though this is not the proper measure to be used.

It would therefore be advantageous to provide a method and apparatus which would permit incoming image data to be evaluated "on the fly" so that, e.g., any mispositioning of the patient or camera could be corrected immediately and the study restarted without a prolonged wait and so that only certain data (e.g. image data from a particular region of interest) would be used to measure parameters of interest (e.g. study duration).

One object of the invention is to provide method and apparatus which would permit a radiologist or radiological technician to determine, at an early stage of a patient study, whether the data collected during the study appears to meet the requirements applicable to the study.

Another object is to provide such method and apparatus which would permit positional corrections of a patient and/or a scintillation camera to be made at an early stage of a patient study so as to avoid completion of the study under inappropriate conditions.

Still another object is, in general, to improve on known methods and apparatus used in nuclear medicine.

The invention proceeds from the realization that a combination of two known (and previously independently used) approaches in principal component analysis (PCA) and factor analysis (FA), together with a novel definition of noise, permits incoming data of the type which is generated by a scintillation camera to be analyzed in real time.

The first of these approaches is exemplified by the work of D. C. Barber, of Sheffield University in the United Kingdom. Barber's work is time-based PCA and FA. In the Barber methodology, a series of images are acquired, one after the other, and recorded. Because the quantity of data thereby acquired is considered unmanageably large, Barber combines (as by a sort of averaging) pixels in the individual frames to construct macro-pixels. Then, Barber retrospectively analyzes the macro-pixels to see if they can be grouped into categories which are temporally covarient. Where this is possible, the results of the Barber PCA and FA is to produce correlated curves showing time-based activity of, e.g., a patient's brain or kidney.

The second of these approaches is exemplified by the work of M. Samal, of Charles University in Czechoslovakia. In the Samal methodology, a series of images is likewise acquired and recorded, but the retrospective analysis is carried out with unreduced data to see if they can be grouped into categories which are area related. Where this is possible, the results of the Samal PCA and FA is to produce correlated curves showing area-based activity of, e.g., two moving phantoms which overlap and expose each other as they move.

In accordance with the invention, each study of interest is analyzed in advance to identify a discrete number of categories of image data which may reasonably be expected to be covarient both regionally and temporally. For example, if the study is a cardiac study, it may reasonably be supposed that there will be a strong linkage between the time variation of all pixels associated with the patient's atria and a second strong linkage between the time variation of all pixels associated with the patient's ventriculi. Thus, it may be supposed that the overall image of the heart during a cardiac study may be approximated to the first order by a combination of two time-varying subimages, one of which subimages represents an atrial image and the other of which subimages represents a ventricular image. Further, the image presented to the camera will be a superposition of these two images as viewed from a particular angle of rotation.

In further accordance with the invention, image data which does not fit into the above-established categories is defined to be noise and is ignored. Thus, in accordance with the invention, there is an a priori definition, on a study-by-study basis, of the sort of image data which contains diagnostic information and the sort of image data which does not; the first sort is collected into categories and used for analysis and image production and the second sort is discarded. Because Poisson noise is a major factor in, e.g., nuclear medicine image data output from the detector head, a discarding of noncategorizable information effects a major reduction in the amount of data which must be processed in subsequent steps and thereby drastically improves the speed of image processing without any degradation of image quality.

In further accordance with the invention, incoming data is examined and binned in the above-referenced pre-established categories. The binned data may then be tested at intervals to make sure that predetermined criteria are met. For example, incoming data collected during a nuclear medicine cardiac study and binned into "atrial" and "ventricular" categories will reflect the orientation between the heart and the camera. Thus, even if there is insufficient information available to form diagnostic images, the statistics of the incoming information will permit the technician to determine that, e.g., a mispositioning of the patient with respect to the camera has taken place and should be corrected.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Because the preferred embodiment proceeds from a binning process wherein incoming data is classified into a plurality of predetermined categories, the following description will commence with an explanation of how the categories are derived and what they mean. Thereafter, the application of the preferred embodiment to a mathematical simulation of a gated bloodpool study will be described.

Figure 1:
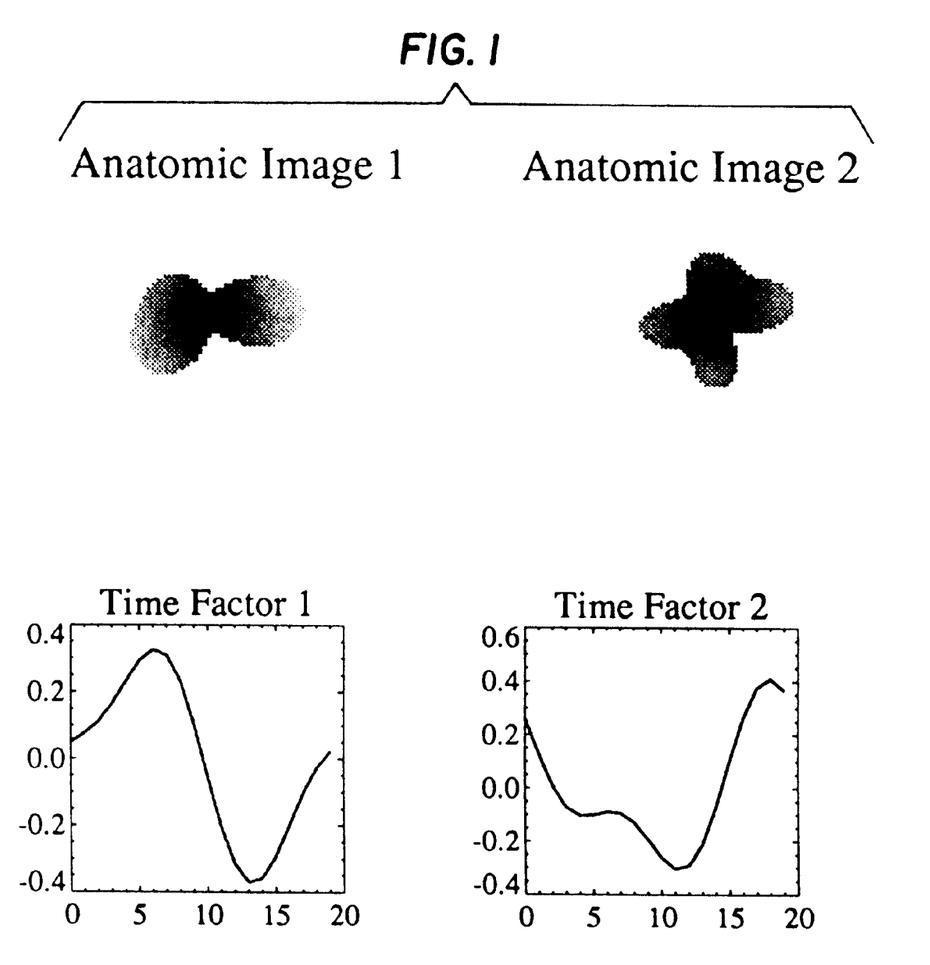
FIG. 1 illustrates time-varying data of the type produced as a result of a gated bloodpool study taken at a 45 degree LAO angle.

The data referred to herein is simulated data designed to mimic images of the type which are produced in, e.g, a gated bloodpool study. In FIG. 1, there is shown an image of the simulated atrial bloodpool (Anatomic Image 1) and a simulated ventricular bloodpool (Anatomic Image 2). Since during the cardiac cycle blood flows into and out of the atria and ventriculi, each of the images varies with time; the simulated data approximates such variation. Therefore, FIG. 1 shows the time variations (Time Factor 1 and Time Factor 2) associated with the atrial and ventricular bloodpools, respectively.

If these two images are superposed and covaried in accordance with the illustrated time variations, the result would simulate a noiseless gated cardiac study. This is shown in FIG. 2.

Figure 2:
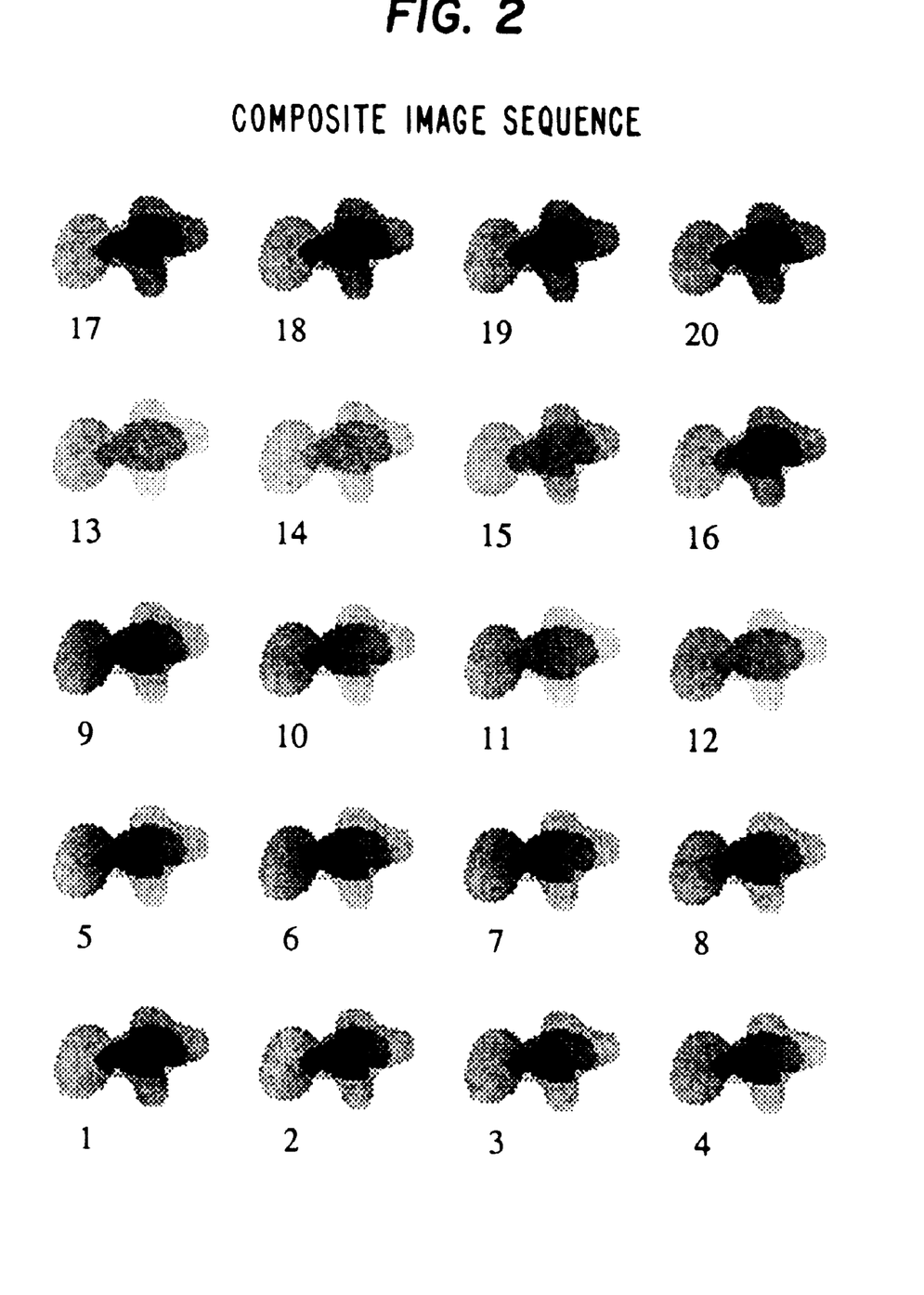
FIG. 2 illustrates how the FIG. 1 data produces a time-varying image series which simulates the image series produced during a patient's cardiac cycle.
Figure 3:
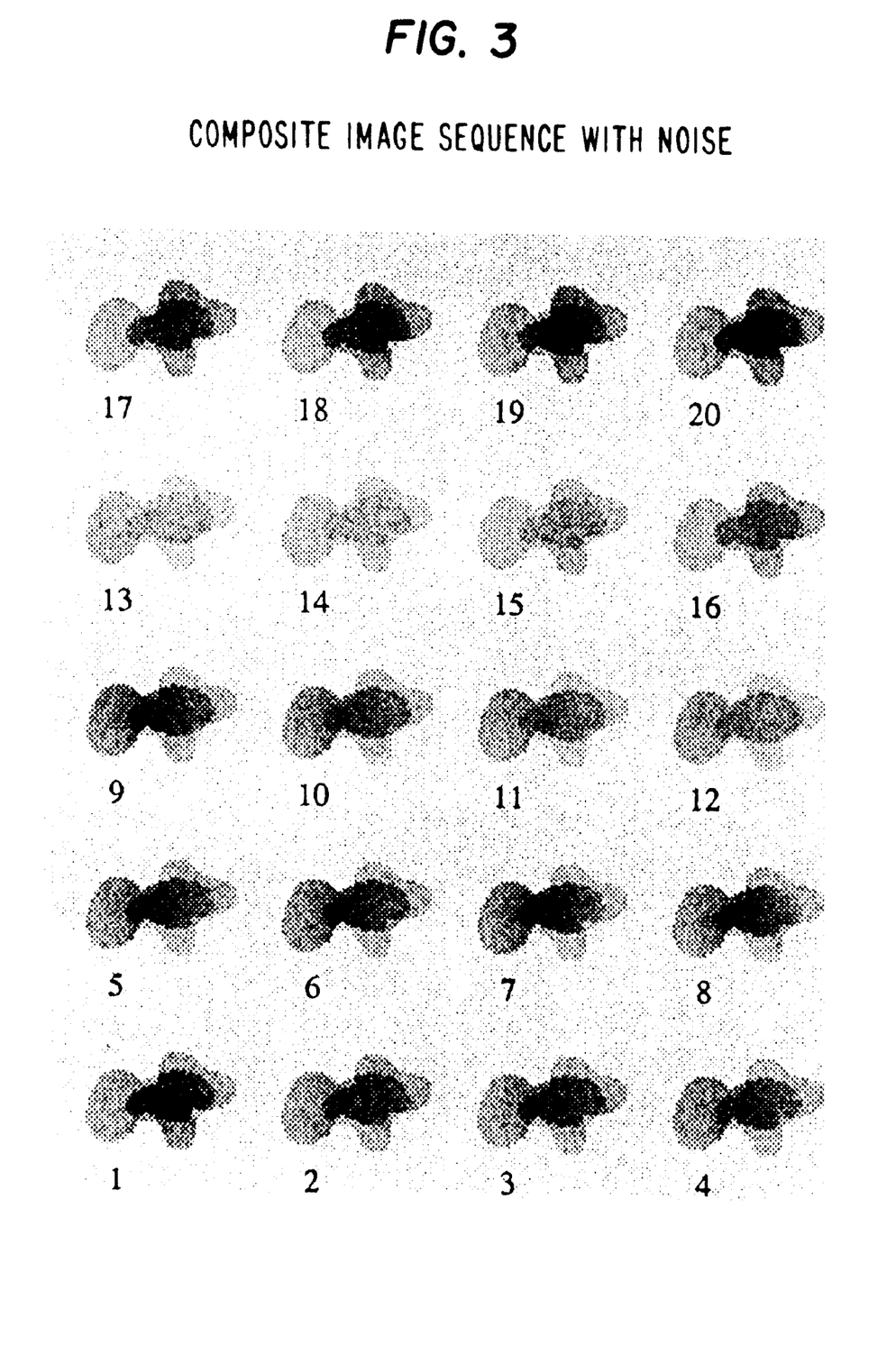
FIG. 3 shows the FIG. 2 image series when noise is added to it.

In practice, the clear results of FIG. 2 are unachievable. This is because noise is a substantial part of nuclear medicine data. FIG. 3 shows results which are more typical of a nuclear medicine study; these were produced by adding Poisson noise to the FIG. 2 simulation.

A principal component analysis can be performed on the data of FIG. 3. This is done by centering and normalizing the data matrix and then extracting the principal component eigenvalues. In other words, the data matrix is analyzed to find groups of data which account for the largest parts of the data variance. The results of such a principal component analysis are shown in FIG. 4.

Figure 4:
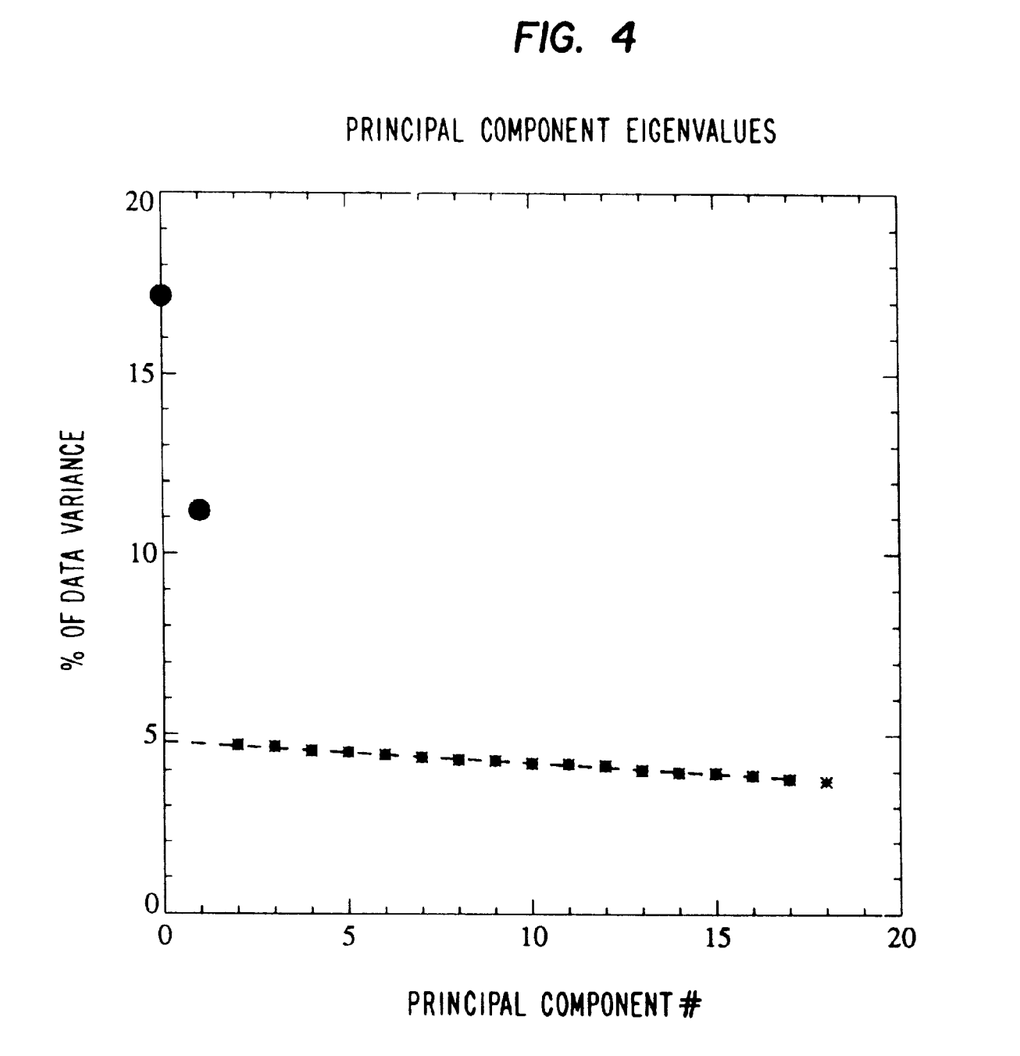
FIG. 4 shows the results of a principal component analysis performed on the FIG. 3 data.

FIG. 4 shows that when the variation of the data of FIG. 3 is actually classified into categories, the data can be placed, or "binned", into nineteen categories. (This is because the simulated data came from a twenty-frame model. In general, N frames worth of data can be exactly represented by N–1 eigenvalues, time vectors and associated images plus an average image.) Of these, the first two categories are the most significant, accounting for 17% and 11% of all data variation in the normalized data matrix. The remaining seventeen categories are all quite close together, each accounting for between 4% and 5% of all data variation.

Figure 5:
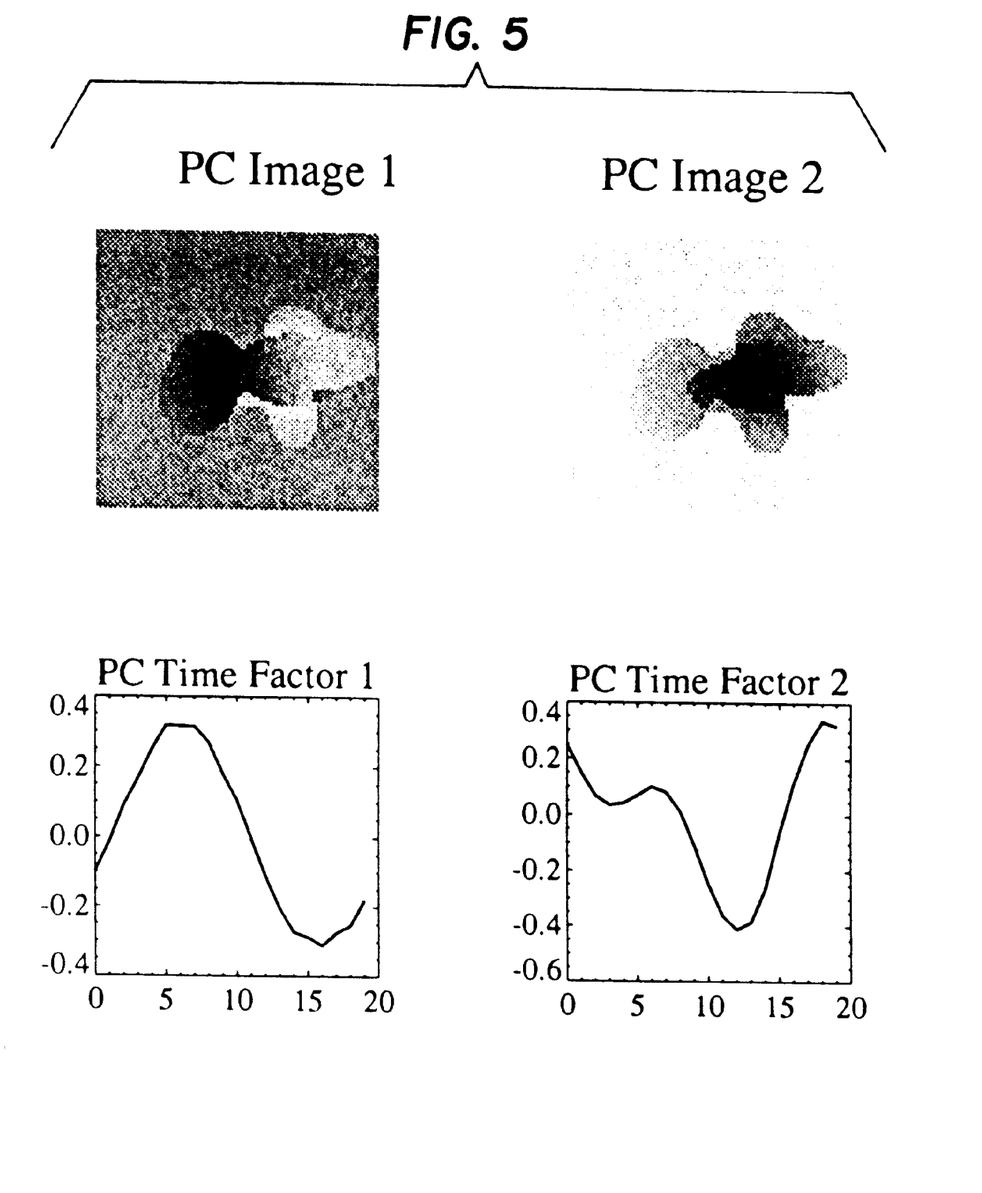
FIG. 5 shows the principal components and associated time factors of the first two eigenvalues in FIG. 4.

Therefore, the data in FIG. 3 is accurately represented by two principal components, plus Poisson noise. (This is the conclusion which ought to follow, since the dynamic image sequence of the preceding figures was constructed by superposing two sets of differently-varying data.) Each principal component is an image formed from a group of pixels which all vary together with time. The principal components and associated time factors are shown in FIG. 5. The accuracy of the representation may be verified by superposing the principal components and varying them together with their respective time functions; the result—FIG. 6—compares well with FIG. 3.

The foregoing analysis demonstrates that original data of the type collected in nuclear medicine can, within noise limits, be reconstructed accurately on the basis of the information in (in this example) two principal components. However, it is advantageous if the principal components can be so chosen as to represent physiologically significant information. This will now be discussed with reference to the principal component images shown in FIGS. 5 and 6.

Figure 6:
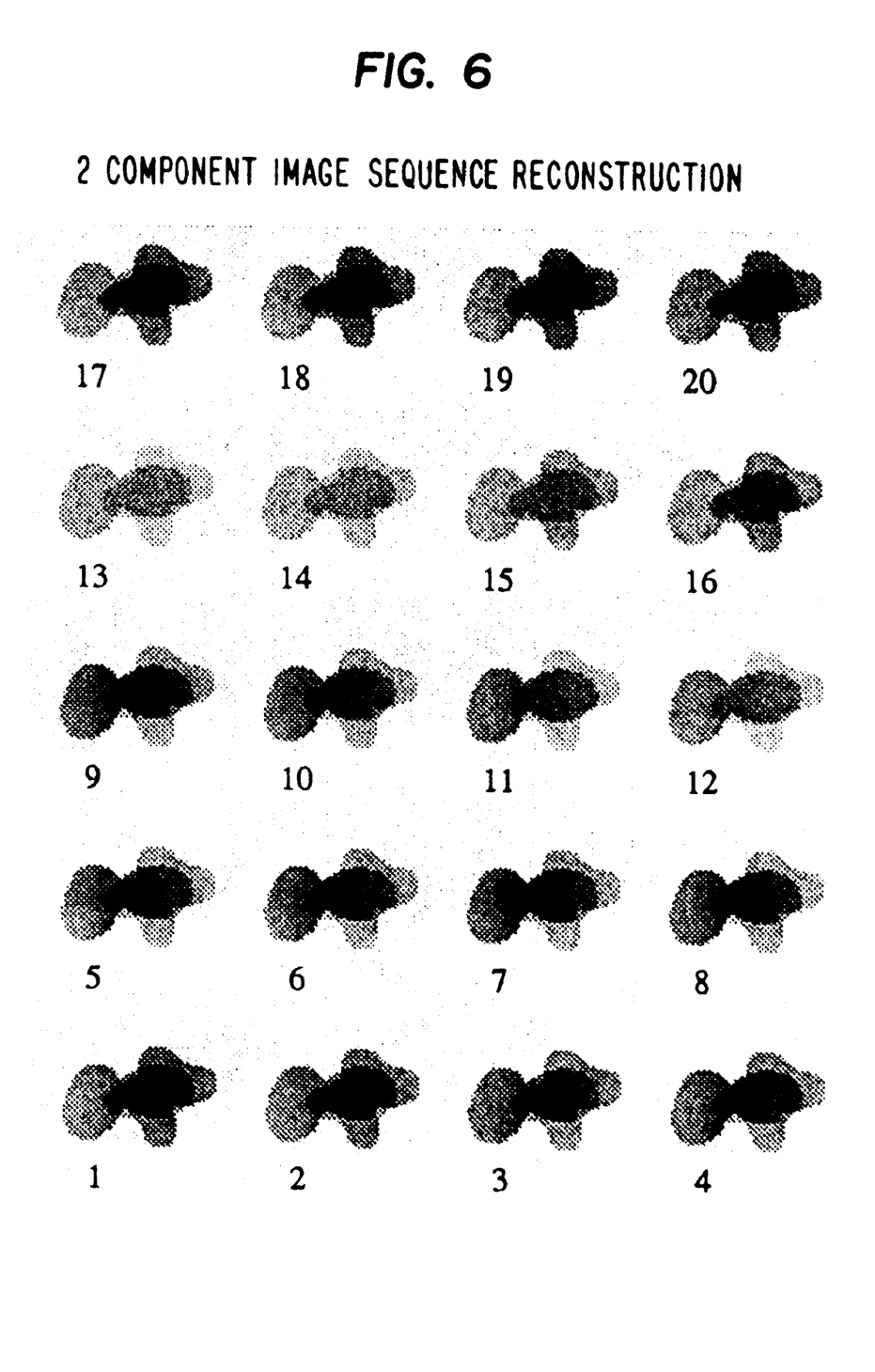
FIG. 6 shows how a superposition of the principal components of FIG. 5 produces results which are similar to FIG. 3.
Figure 7:
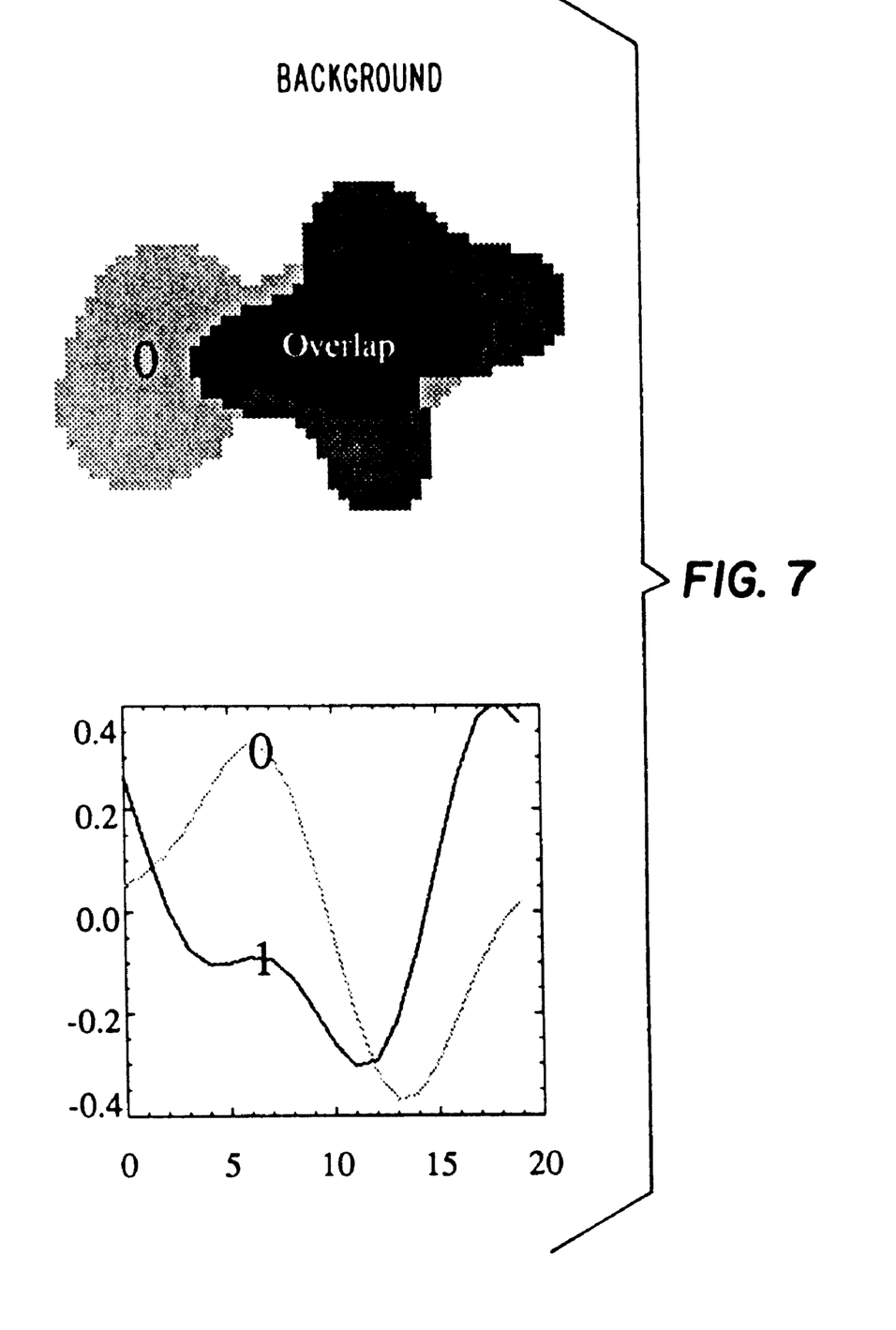
FIG. 7 shows how each element of the FIG. 6 image series can be represented as a superposition of three regions.

Each of the images in the FIG. 6 sequence reconstruction has the same shape and may—as is illustrated in FIG. 7—be divided for purposes of analysis into three regions (plus a background). Two of the regions—regions 0 and 1—vary as do the time factors in the anatomic images; the third region is the overlap between regions 0 and 1.

Figure 8:
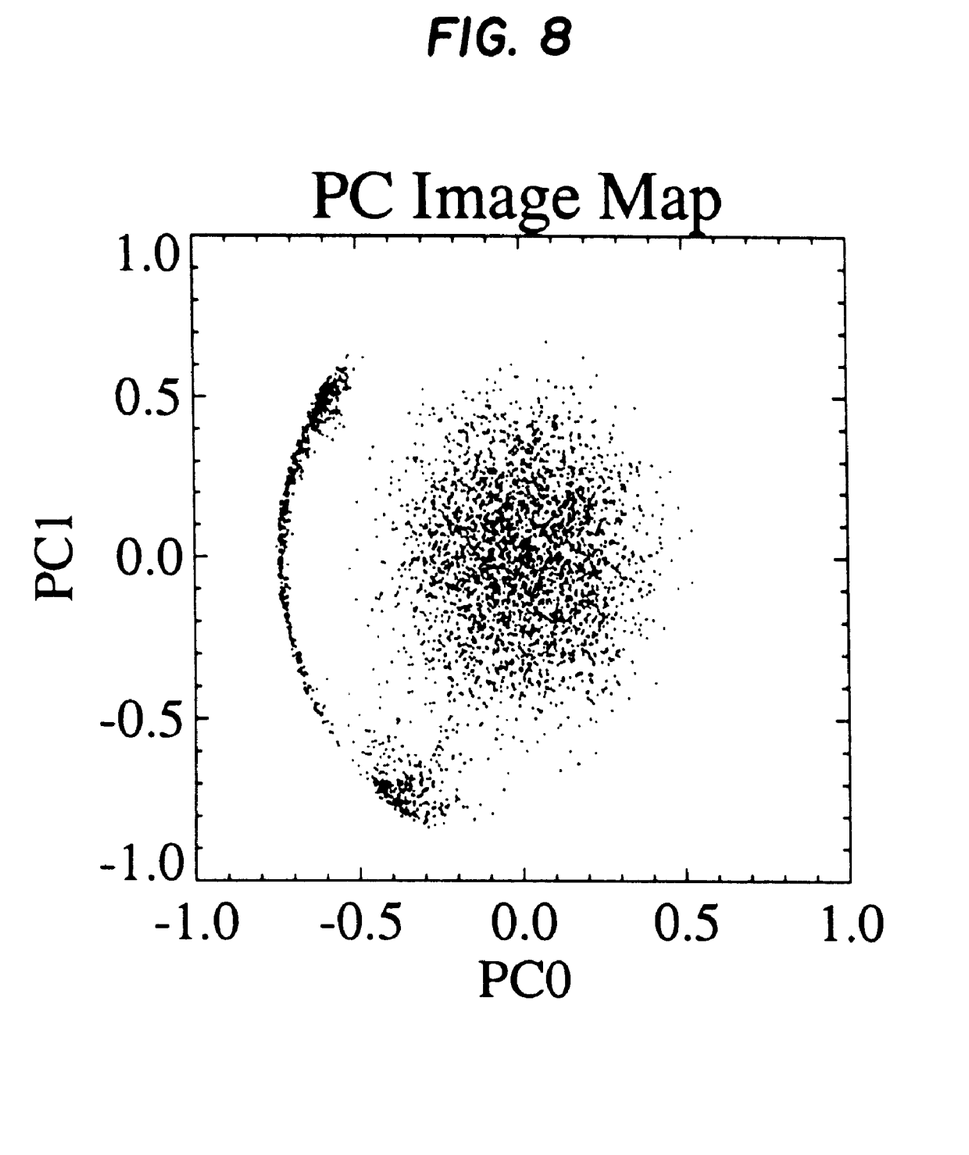
FIG. 8 shows how data in FIG. 6 is distributed as regards time variation and variation with the FIG. 5 principal components.
Figure 9:
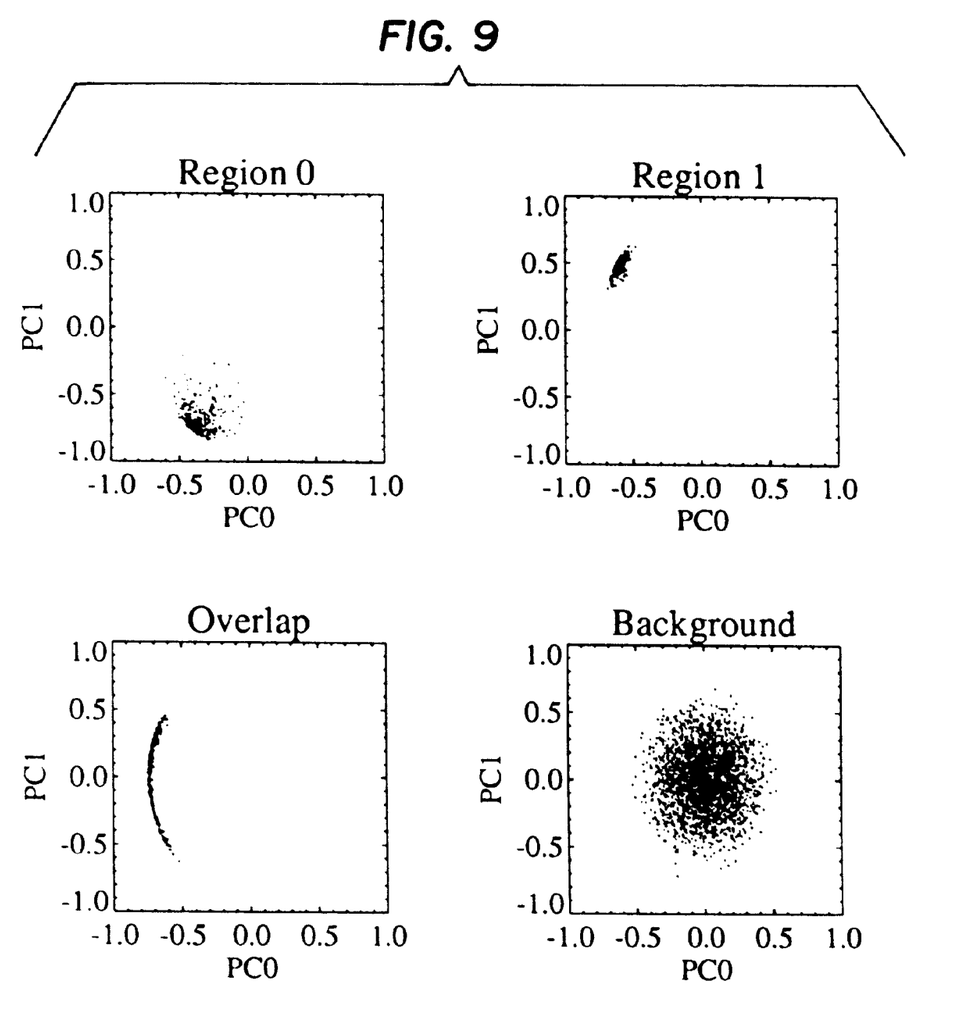
FIG. 9 shows how the reorganized data in FIG. 8 correlates with the regions of FIG. 7.

It is possible to reorganize the data in FIG. 3 so as to associate, with each other, those pixels in the principal component images shown in FIG. 5 which vary together with time. This results in the distribution shown in FIG. 8 which, it will be noted, is independent of time. In FIG. 8, clusters of data indicate pixels which are closely temporally covarient, and the locations of the clusters indicate how the pixels vary with respect to the two principal time factors shown in FIG. 5. Then, the reorganized data in FIG. 8 can be correlated with the four regions shown in FIG. 7. The results of this second correlation are shown in FIG. 9. Here, it becomes apparent that the cloud of data which surrounds (0,0) is from the background and is of no utility, and that the meaningful data in FIG. 8 appears in, and especially at the ends of, the circular arc of data points which appears at the left-hand side of FIG. 8.

Considering this circular arc of data in FIG. 8, it will be noted that the two endpoints of the arc do not lie, respectively, on the X and Y axes of the graph. While this is mathematically of little consequence, it has practical ramifications because to a person skilled in the art, this means that each of the principal components is a blend of data and likely has no independent physical (hence diagnostic) significance. Phrased another way, the position of the arc indicates that each of the principal components in FIG. 8 is likely to be a blend of atrial and ventricular data. It would be advantageous if the principal components could be reformulated into functions which had physical meaning in addition to mathematical meaning.

Figure 10:
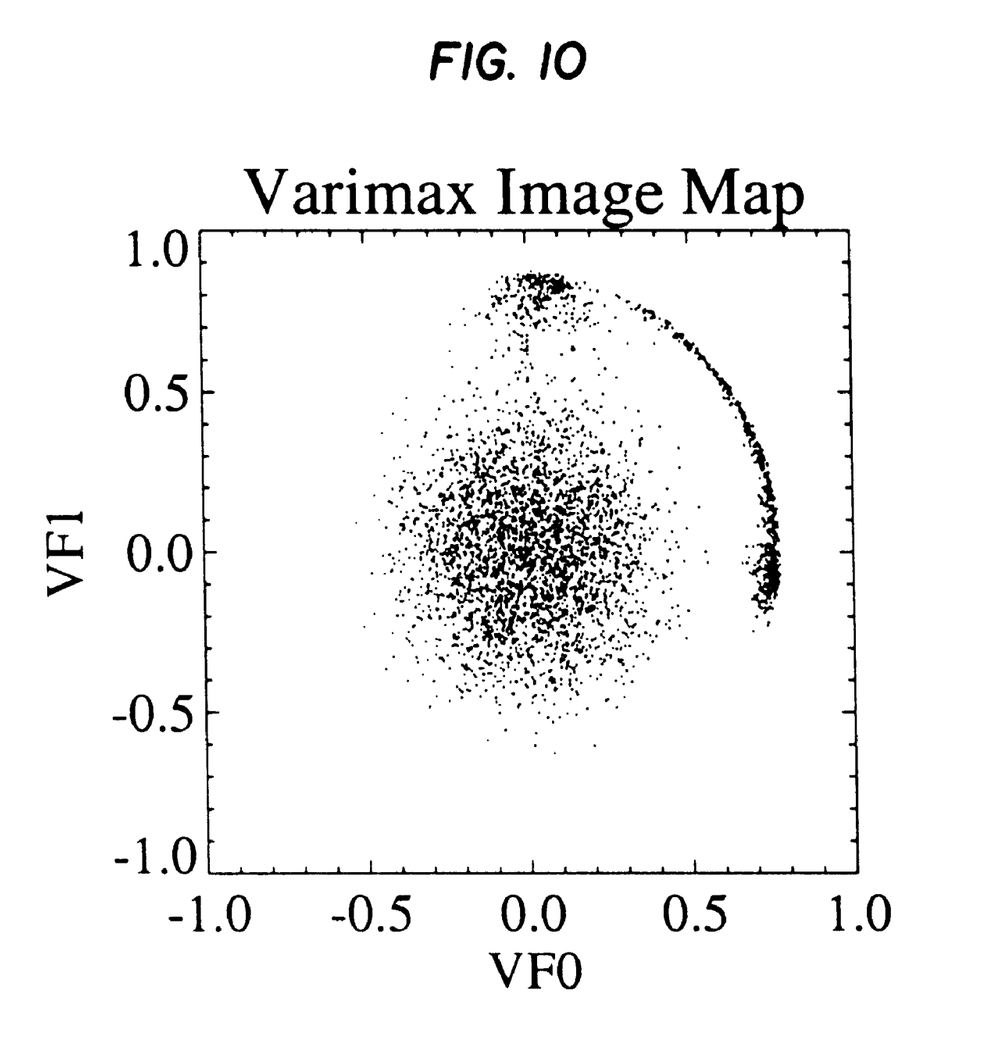
FIG. 10 illustrates the results of operating on the FIG. 8 data using a varimax algorithm.

A technique for such reformulation exists. This technique is known as the varimax (from maximization of variance) method. The varimax method, operating on data such as is shown in FIG. 8, reformulates the principal components in such a way as to maximize the variance of the squared varimax factor weights (image values). The results of the varimax method are shown in FIG. 10, wherein there is also an arc of data, but the data at the ends of the arc lies on the X and Y axes.

Figure 11:
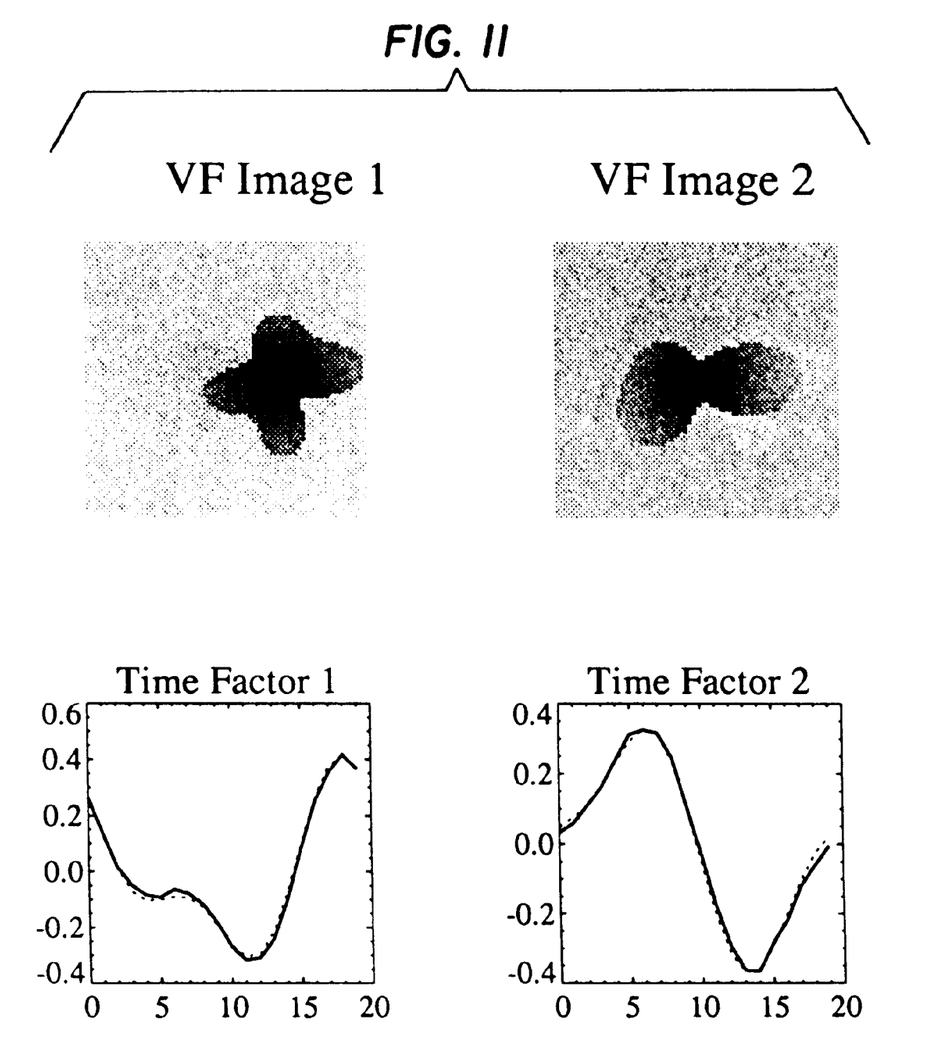
FIG. 11 shows two varimax function images and associated time factors.

Using the varimax functions which result from this varimax reformulation, there result two varimax function images and associated time factors as are shown in FIG. 11. Comparison between FIGS. 11 and 1 reveals that there is a high correlation between the two. Consequently, it has been demonstrated that data from a gated bloodpool study taken at the proper camera angle (45 degree LAO) is characterized by a known distribution of data in a plurality of predetermined categories. The consequence of this is that it is possible to evaluate incoming data for e.g. proper positioning of the camera with respect to the patient, relatively soon after the commencement of a study and long before enough data has been collected to complete the study.

Figure 12A:
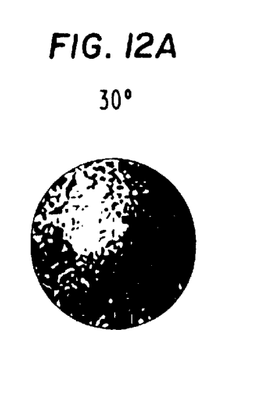
FIGS. 12A, 12B and 12C show, respectively, images formed from one minute's worth of simulated data from a gated equilibrium cardiac study taken at LAO angles of 30, 40 and 50 degrees.
Figure 12B:
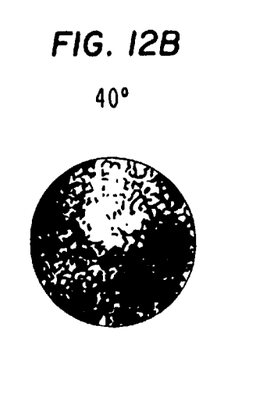
Figure 12C:
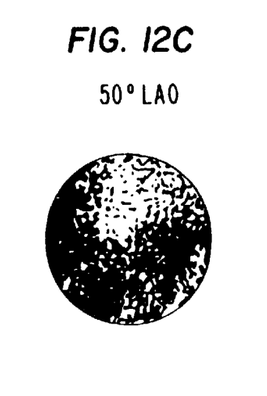

This highly advantageous consequence is illustrated in FIGS. 12 and 13. One minute's worth of simulated data from a gated equilibrium cardiac study taken at three different views (30 degrees, 40 degrees and 50 degrees LAO) was used to produce an image of each view. As can be seen in FIG. 12, the data was insufficient to produce an image which could be used for any diagnostic purpose.

Figure 13A:
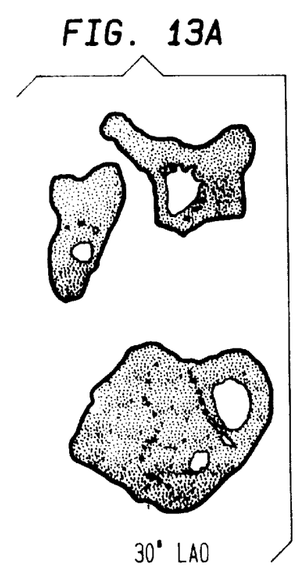
FIGS. 13A, 13B and 13C show, respectively, factor images produced by rebinning of the data presented in FIGS. 12A, 12B and 13B.
Figure 13B:
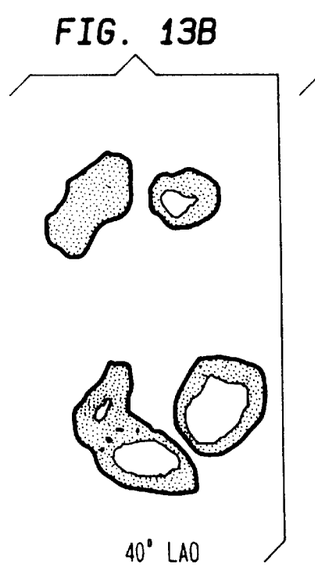
Figure 13C:
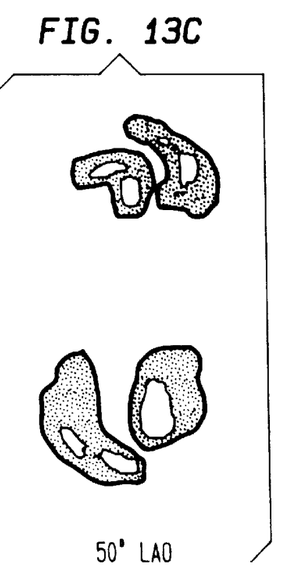

However, when the data was rebinned into the first two principal components discussed above in connection with FIG. 5 and factor images produced from the principal components, it was possible to identify whether the patient positioning was appropriate. In FIG. 13A, which is at 30 degrees LAO, the left ventricle overlaps the left atrium. In FIG. 13C, which is at 50 degrees LAO, the right ventricle projects into the region of the right atrium. In FIG. 13B, which is at 40 degrees LAO, there is no atrial-ventricular overlapping and little ventricle projection into atrial regions. Accordingly, the ideal angle is somewhere between the 40 degree LAO angle of FIG. 13B and the 50 degree LAO angle of FIG. 13C, which conforms well with the theoretically optimized positioning which would be expected at 45 degrees LAO. Consequently, it is possible to determine whether patient positioning is appropriate on the basis of only one minute of simulated data, which is much less data than is required to conduct an entire study.

Figure 14A:
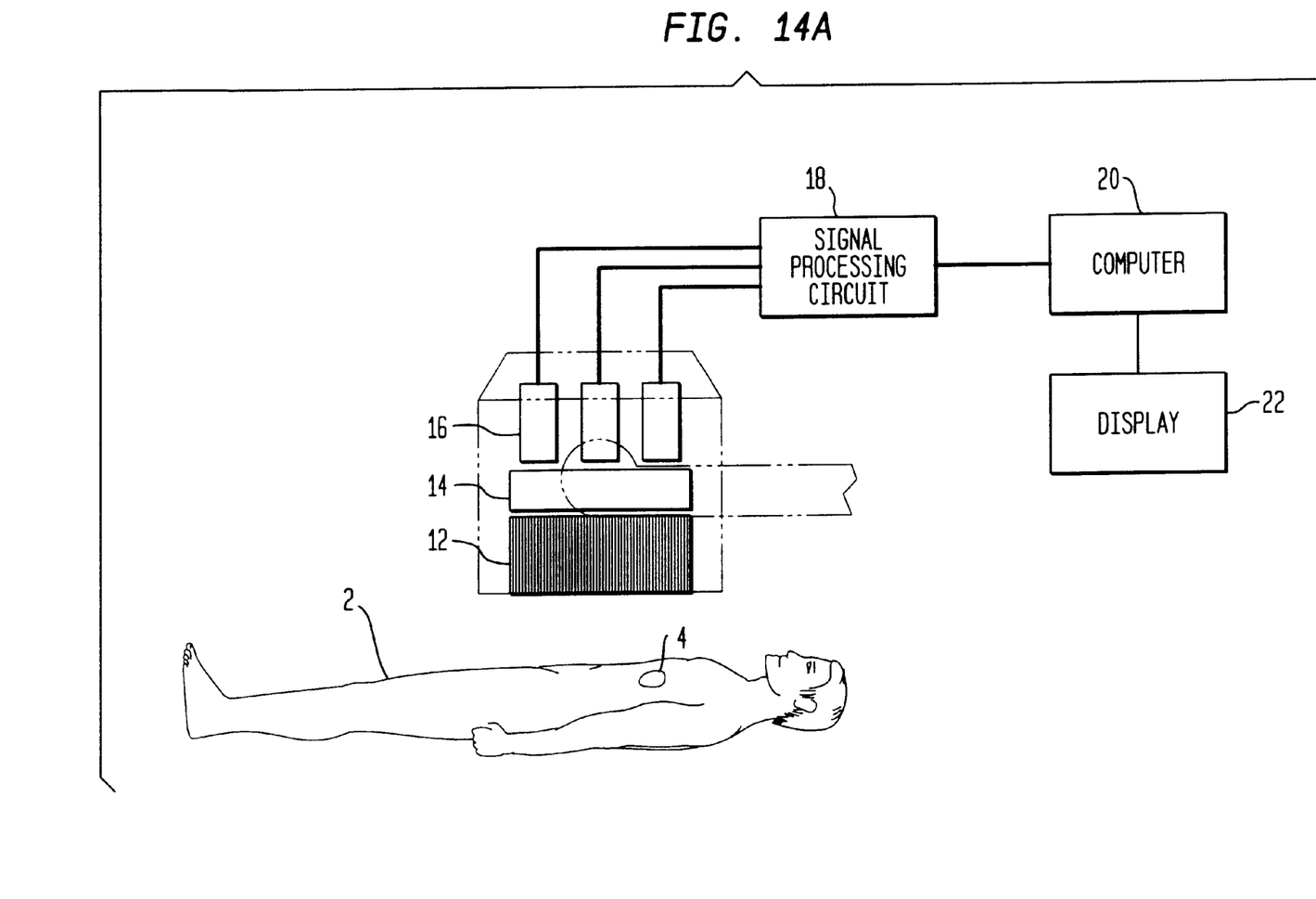
FIGS. 14A and 14B are schematized diagrams showing a scintillation camera system in accordance with a preferred embodiment of the invention.
Figure 14B:
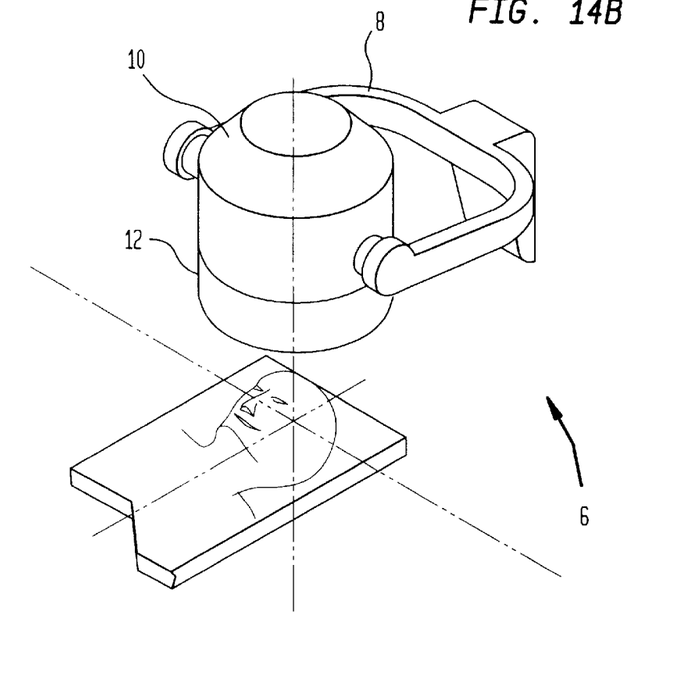

Therefore, as is schematically illustrated in FIGS. 14A and 14B, a patient 2 is injected with a radioisotope (not shown) which collects, e.g., in the patient's heart 4. A scintillation camera generally indicated by reference numeral 6 has a gantry 8 which supports the detector 10 and positions the detector 10 with respect to the patient 2.

During e.g. a gated bloodpool cardiac study, gamma radiation from the heart 4 leaves the patient, is collimated by a collimator 12 on the detector and becomes incident upon a scintillation crystal 14. Interaction between the gamma radiation and the crystal 14 causes flashes of scintillation light to be created in the crystal 14 and these scintillation events are picked up by an array of photomultiplier tubes 16 which are placed in operative relation with the crystal 14. Electrical signals from the photomultiplier tubes 16 are routed to signal processing circuitry 18 which isolates out useful scintillation events and corrects the resulting information for errors caused by distortion factors which are inherent in Anger-type cameras.

Corrected data from the signal processing circuitry 18 is then input to a computer 20. The computer 20 prepares from the data a two or three-dimensional image which may be displayed on a display 22. As the study data is collected, the computer 20 bins the data on a real-time basis into categories such as those discussed above. After a relatively short period of time which is insufficient to finish the study, the binned data is examined.

Figure 15:
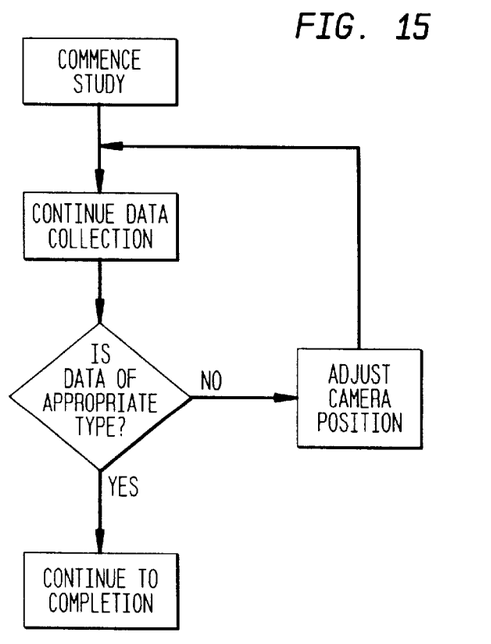
FIG. 15 is a flow chart illustrating a preferred embodiment of the method aspect of the invention.

Mathematical simulation shows that it is possible to determine the appropriateness of the camera position only one minute after commencement of a study. This is because the distribution of data in the various predetermined categories is only a function of camera position and remains constant even as the quantity of data increases. Consequently, once it is possible to determine what is the distribution of data (and this is possible at a very early stage of the study) it is possible to evaluate whether the camera angle is proper or not, even if the amount of data collected at the time of this evaluation is insufficient to form a clinically acceptable image. The camera angle may then be corrected so as avoid conducting an entire study at an incorrect orientation with respect to the patient's heart. This is illustrated in FIG. 15.

Furthermore, the categories are chosen (as discussed above) to have physical significance. It is therefore possible to specifically identify, by their characteristic time variation, events which e.g. originate in the left ventricle, and to use only the number of such events as the criterion by which study duration is determined.

The images shown in FIGS. 13A, 13B and 13C were produced using a constraint of positivity. This is because it may properly be assumed that in the absence of a change in boundaries of an object under study (such as is the case in a gated blood pool study where the blood pools are bounded by moving atrial and ventricular walls) a physiological process will produce only positive activity distributions, i.e. the presence of a radioisotope within an image field can never have a negative contribution to the image. This constraint was implemented by reformulating the entire set of varimax functions and associated function images, and such constraints are discussed in the literature. Other constraints (e.g. time constraints) may also be used to improve the FIGS. 13A, 13B and 13C results; this is within the knowledge of a person skilled in the art. The particular constraints applied will be determined with regard to the desired results and the availability of computer resources and will not be further described here.

Although a preferred embodiment has been described above, the scope of the invention is limited only by the following claims:

I claim:

1. A method for processing image data resulting from a nuclear medicine patient study, comprising the following steps:

establishing, for the study, a plurality of data categories, each data category including image data relating to image pixels which are essentially covarient during the study with respect to a cyclical physiological process to which the study is related;

commencing collection of image data; and classifying, in real time, the image data into said data categories.

2. The method of claim 1, wherein the process is the patient's cardiac cycle.

3. A method for conducting a nuclear medicine patient study on a patient using a scintillation camera, comprising the following steps:

positioning the patient and camera in-positions which are preliminarily determined to be appropriate for conducting the study;

commencing collection of event data of a type that is suitable to form an image of the patient's internal anatomy; and evaluating said collected event data, in real time and at the end of an interval of time which is insufficient to finish the study, to determine whether the patient and camera are in fact positioned appropriately for conducting the study.

4. A method for conducting a nuclear medicine patient study on a patient using a scintillation camera, comprising the following steps:

commencing collection of data of type that is suitable to form an image of the patient's internal anatomy; and evaluating said collected data, in real time and at the end of an interval of time which is insufficient to finish the study, to determine whether the data collected is appropriate for conducting the study.

5. The method of claim 4, further comprising the step of changing at least one parameter of the study where said evaluation step indicates that the data collected is inappropriate for conducting the study.

6. Scintillation camera apparatus comprising:

a detector head including a scintillation crystal and a plurality of photomultipliers placed in operative relation therewith;

a gantry supporting the detector head and moving it as required; and signal processing means connected in operative relationship with the photomultipliers, said signal processing means comprising means for classifying, in real time, data originating in the detector head into a plurality of categories, each of which categories includes image data relating to image pixels which are essentially covarient during a study of a patient with respect to a cyclical physiological process to which the study is related; and means for producing images of parts of the patient's body from image data encompassed in said data categories.

* * * * *